United States Patent Office 3,485,926
Patented Dec. 23, 1969

3,485,926
α-METHYLPHENETHYLAMINO ANORECTIC COMPOSITIONS AND USE
Wilhelm Alfons Schuler and Ansgar V. Schlichtegroll, Bad Homburg von der Hohe, Helmut Beschke, Frankfurt am Main, and Karl-Heinz Klingler, Langen-Hesse, Germany, assignors to Hoffmann-La Roche Inc., Nutley, N.J., a corporation of New Jersey
No Drawing. Continuation of application Ser. No. 380,910, July 7, 1964. This application Mar. 1, 1966, Ser. No. 538,464
Claims priority, application Germany, Mar. 18, 1959, D 30,233
Int. Cl. A61k 27/00; C07c 87/22
U.S. Cl. 424—330                    6 Claims

ABSTRACT OF THE DISCLOSURE

Compounds of the formula

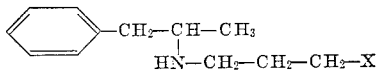
HN—CH₂—CH₂—CH₂—X in which X represents chloro or bromo and salts thereof with medicinally acceptable acids are useful as anorexic agents upon administration of from 40 mg. to 120 mg. of the compound daily.

RELATED APPLICATIONS

This application is a continuation of application Ser. No. 380,910, filed July 7, 1964, now abandoned, which in turn is a continuation-in-part of application Ser. No. 14,496, filed Mar. 14, 1960, now abandoned.

This invention relates, in general, to a novel class of therapeutically active compounds and to processes for producing same. More particularly, the invention relates to the use of such compounds as appetite-suppressing agents.

The compounds of this invention are selected from the group consisting of a member having the formula

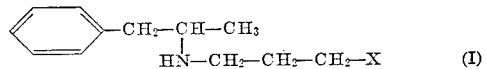
HN—CH₂—CH₂—CH₂—X    (I)

in which the symbol X represents a halogen atom and salts thereof with medicinally acceptable acids, such as, hydrochloric acid, hydrobromic acid, etc.

The preferred compound of this invention is N-(3-chloropropyl)-α-methylphenethylamine hydrochloride, i.e., the hydrochloric acid salt of that compound of Formula I in which X is chlorine.

The compounds of this invention possess appetite-suppressing activity and, as such, are useful as anorectic agents in the treatment of obesity of established dietary origin. These compounds exert an appetite-suppressing effect, measured in terms of reduction of food intake or of weight decrease, which is equal in magnitude to that exerted by phenmetrazine, a known anorectic agent. Unexpectedly, however, the compounds of this invention have been found to bring about symptoms of central stimulation which are distinctly less pronounced than those occasioned by the administration of phenmetrazine.

The compounds of this invention are readily produced. In one suitable method, these compounds are obtained by reacting a compound having the formula

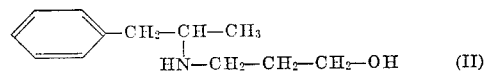
HN—CH₂—CH₂—CH₂—OH    (II)

with a compound which will, in a known manner, replace the aliphatic hydroxy group with a halogen atom, for example, a chlorine or bromine atom. Included among the halogenating agents which can be used in this particular process are thionyl chloride and hydrohalic acids, such as, hydrochloric acid, hydrobromic acid, etc.

In an alternate preparative method, the compounds of this invention are obtained by reacting a primary amine having the formula

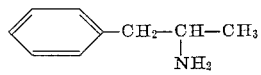
NH₂ with a halogenated carbonyl compound, such as, β-chloropropionaldehyde, in a known manner, under hydrogenating conditions. The process described in this paragraph, as well as the process described in the immediately preceding paragraph, will be more fully exemplified in the examples which follow hereinafter.

As indicated heretofore, the compounds of this invention exhibit appetite-suppressing activity and, as such, are useful as anti-obesity drugs. For such use, the presently disclosed compounds are formulated, using conventional inert pharmaceutical adjuvant materials, into dosage forms which are suitable for oral or parenteral administration. Such dosage forms include tablets, suspensions, solutions, etc. Furthermore, the compounds of this invention can be embodied into, and administered in the form of, suitable hard or soft capsules. The identity of the inert adjuvant materials which are used in formulating the present compounds into oral and parenteral dosage forms will be immediately apparent to persons skilled in the art. These adjuvant materials, either inorganic or organic in nature, include, for example, water, gelatin, lactose, starch, magnesium stearate, talc, vegetable oils, gums, polyalkylene, glycols, etc. Moreover, preservatives, stabilizers, wetting agents, emulsifying agents, salts for altering osmotic pressure, buffers, etc. can be incorporated, if desired, into such formulations.

The compounds of this invention are effective, as appetite-suppressing agents in the treatment of patients with obesity of established dietary origin, within a relatively wide dosage range. To some extent, the needs and requirements of the individual patient will have a distinct bearing upon the quantity of drug administered over any given time interval. It has been found, however, that as a general rule, the daily administration of from 40 mg. to 120 mg. of a compound of this invention will prove to be effective.

The preferred oral dosage forms of the present invention contain from about 20 mg. to 40 mg. of the active drug ingredient. The preferred parenteral dosage forms will contain about 10 mg. of the active drug ingredient per ml. of parenteral solution. The drug, in the preferred oral dosage forms, will be administered, under ordinary circumstances, three times a day, generally one hour before each meal. It will be fully understood, however, that dosage forms containing a larger or smaller quantity of the active drug ingredient are encompassed within the scope of this invention and, similarly, it will be understood that such dosage forms can be administered more or less frequently than indicated heretofore.

For a fuller understanding of the nature and objects of this invention, reference may be had to the following examples which are given merely as further illustrations of the invention and are not to be construed in a limiting sense. All parts given in said examples are parts by weight unless otherwise indicated.

Example 1

In this example, 30 parts of N-(3-hydoxypropyl)-α-methylphenethylamine were dissolved in 90 parts of chloroform. Subsequently, this solution was saturated with hydrogen chloride gas. Thereafter, 28 parts of thionyl chloride were added slowly to the mixture. During such addition, the reaction mixture was continuously heated at its reflux temperature and stirred. After all of the thionyl chloride had been added, the reaction was refluxed for an additional 30 minute period, following which it was evaporated to dryness. The residue was recrystallized from ethanol to yield N-(3-chloropropyl)-α-methylphenethylamine hydrochloride melting at 128° to 130° C.

Example 2

In this example, 9.5 parts of β-chloropropionaldehyde were added slowly, at a temperature of 0° C., to a solution of 31.5 parts of 1-phenyl-2-amino propane in 150 parts of methanol. Thereafter, 0.2 part of platinum oxide was added to the reaction mixture following which the mixture was reacted with hydrogen, in a shaking vessel, until the theoretical quantity of hydrogen had been taken up. When the hydrogenation reaction was completed, the catalyst was removed by filtration and the filtrate neutralized with hydrochloric acid. Subsequently, the filtrate was evaporated to dryness and recrystallized from isoproply alcohol. The thus obtained N-(3-chloropropyl)-α-methylphenethylamine hydrochloride melted at 128° to 130° C.

Example 3

This example is included herein to demonstrate the formulation of dosage forms containing N-(3-chloropropyl)-α-methylphenethylamine hydrochloride. The quantities given are per tablet and per capsule and, in the case of the parenteral formulation, per 1 ml. of parenteral solution.

*Tablets.*—25 mg. of N-(3-chloropropyl)-α-methylphenethylamine hydrochloride, 62 mg. of lactose, 25 mg. of corn starch, U.S.P. and 10 mg. of Amijel B011 (a pre-hydrolyzed food grade corn starch) were charged into, and blended in, a mixer. This blend was granulated to a paste using a small quantity of water. The granulate was subsequently comminuted using a #12 screen. Thereafter, the granulate was dried at a temperature of 110° F. for a period of 16 hours. The dried granulate, thus obtained, was then comminuted using a #16 screen and transferred to a suitable mixer. Thereafter, 1 mg. of calcium stearate and 2 mg. of talc was added and the mixture which was thus obtained was mixed until uniform. The granulate was compressed at a tablet weight of 125 mg., using tablet punches having a diameter of approximately ¼".

*Capsules.*—50 mg. of N-(3-chloropropyl)-α-methylphenethylamine hydrochloride was mixed with 230 mg. of lactose and 60 mg. of corn starch. The mixture was blended by passing same through a Fitzpatrick Comminuting Machine using a #1A screen, with knives forward. Thereafter, 10 mg. of talc was added to the mixture and blended therewith. The powder thus obtained was subsequently filled into #3 hard shell gelatin capsules.

*Parenteral.*—10 mg. of N-(3-chloropropyl)-α-methylphenethylamine hydrochloride and 10 mg. of benzyl alcohol were dissolved in sufficient water to make 1 ml. of solution. The solution, thus obtained, was placed in a tightly stoppered glass container and allowed to stand therein for a period of about 24 hours. The solution was then filtered, under aseptic conditions, through an 02 Selas candle. Subsequently, and once again under aseptic conditions, the solution was filtered into a sterilized ampul and the ampul was sealed under an atmosphere of nitrogen.

We claim:

1. A composition for suppressing the appetite which contains as the active compound from about 10 mg. to about 40 mg. of a compound selected from the group consisting of a member having the formula

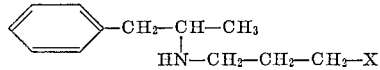

in which X represents chloro or bromo and salts thereof with a medicinally acceptable acid in admixture with inert pharmaceutical adjuvants.

2. The composition of claim 1 which, in dosage form for oral administration, contains from about 20 mg. to about 40 mg. of N-(3-chloropropyl)-α-methylphenethylamine hydrochloride.

3. The composition of claim 1 which, in dosage form for parenteral administration, contains about 10 mg. of N - (3-chloropropyl)-α-methylphenethylamine hydrochloride per ml. of parenteral solution.

4. A method for suppressing the appetite of humans which comprises administering daily to the patient from about 40 mg. to about 120 mg. of a compound selected from the group consisting of a member having the formula

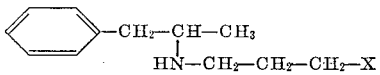

in which X represents chloro or bromo and salts thereof with a medicinally acceptable acid.

5. The method of claim 4 wherein N-(3-chloropropyl)-α-methylphenethylamine hydrochloride is administered orally in the form of a composition containing as the active compound from about 20 mg. to 40 mg. of said N-(3-chloropropyl)-α-methylphenethylamine hydrochloride.

6. The method of claim 4 wherein N-(3-chloropropyl)-α-methylphenethylamine hydrochloride is administered parenterally in the form of a composition containing as the active compound about 10 mg. of said N-(3-chloropropyl)-α-methylphenethylamine hydrochloride per ml. of parenteral solution.

References Cited

FOREIGN PATENTS 217,713  8/1957  Australia.

OTHER REFERENCES

Rapp et al.; "Ukrain Khim. Zhur," vol. 23, pages 637–41 (1957).

Williams et al.: Obesity and its Treatment, Annals of Internal Med., vol. 29, September 1948, pages 522–523.

Jenkins et al.: The Chemistry of Organic Medicinal Products, 1957, pages 220–233, RS403 04 1957.

FRANK CACCIAPAGLIA, Jr., Primary Examiner